US011922135B2

(12) United States Patent
Yonemura (10) Patent No.: US 11,922,135 B2
(45) Date of Patent: Mar. 5, 2024

(54) NUMBER-THEORETIC TRANSFORM PROCESSING APPARATUS, NUMBER-THEORETIC TRANSFORM PROCESSING METHOD, AND COMPUTER PROGRAM PRODUCT

(71) Applicant: KABUSHIKI KAISHA TOSHIBA, Minato-ku (JP)

(72) Inventor: Tomoko Yonemura, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 529 days.

(21) Appl. No.: 17/005,390

(22) Filed: Aug. 28, 2020

(65) Prior Publication Data
US 2021/0279040 A1 Sep. 9, 2021

(30) Foreign Application Priority Data

Mar. 6, 2020 (JP) .................. 2020-038923

(51) Int. Cl.
*H04L 9/30* (2006.01)
*G06F 7/72* (2006.01)
*G10L 21/0208* (2013.01)

(52) U.S. Cl.
CPC .......... *G06F 7/725* (2013.01); *G10L 21/0208* (2013.01); *H04L 9/3093* (2013.01)

(58) Field of Classification Search
CPC .... G06F 7/725; G10L 21/0208; H04L 9/3093
See application file for complete search history.

(56) References Cited

U.S. PATENT DOCUMENTS

| 10,075,288 | B1 * | 9/2018 | Khedr | ...................... H04L 9/008 |
| 10,778,408 | B1 * | 9/2020 | Khedr | ...................... H04L 9/008 |
| 2017/0149796 | A1 * | 5/2017 | Gvili | ........................ H04L 9/085 |
| 2019/0044720 | A1 * | 2/2019 | Poeppelmann | ....... H04L 9/0869 |
| 2020/0313886 | A1 * | 10/2020 | Poeppelmann | ....... H04L 9/3236 |
| 2021/0226791 | A1 * | 7/2021 | Kusagawa | ............ H04L 9/3093 |

FOREIGN PATENT DOCUMENTS

CN 106685663 A * 5/2017

OTHER PUBLICATIONS

Nejatollahi et al. Software and Hardware Implementation of Lattice-based Cryptography Schemes, 2017, Center for Embedded & Cyber-Physical Systems, pp. 1-43. (Year: 2017).*
Roy et al. Compact Ring-LWE Cryptoprocessor, 2014, International Association for Cryptologic Research. pp. 371-391. (Year: 2014).*

(Continued)

*Primary Examiner* — Lynn D Feild
*Assistant Examiner* — Abdullah Almamun
(74) *Attorney, Agent, or Firm* — Oblon, McClelland, Maier & Neustadt, L.L.P.

(57) ABSTRACT

According to an embodiment, a number-theoretic transform processing apparatus for a noise in lattice-based cryptography includes a processor configured to perform number-theoretic transform of the noise using a precomputation table including a combination of products of one or more elements that belong to a subspace of a finite field $Z_q$ and indicate coefficients of the noise, with one or more number-theoretic transform constants.

11 Claims, 5 Drawing Sheets

(56) References Cited

OTHER PUBLICATIONS

Al Badawi et al. Accelerating subset sum and lattice based public-key cryptosystems with multi-core CPUs and GPUs, 2018, J. Parallel Distrib. Comput., pp. 179-190. (Year: 2018).*

Alkim et al., "NewHope Algorithm Specifications and Supporting Documentation", (NIST PQC Round 2), [online], <URL: https://csrc.nist.gov/CSRC/media/Projects/Post-Quantum-Cryptography/documents/round-2/submissions/NewHope-Round2.zip>, 46 pages.

* cited by examiner

| NUM-BER | METHOD | NUMBER OF Zq MULTIPLICA-TIONS | PRECOMPUTA-TION VOLUME | NUMBER OF Zq ADDITIONS |
|---|---|---|---|---|
| 1 | METHOD IN WHICH NO INGENUITY IS APPLIED | $2n(n-1)$ | $2n$ | $n(n-1)$ |
| 2 | HIGH-SPEED COMPUTING METHOD | $n*\log(n)-1$ | $2n$ | $n*\log(n)$ |
| 3 | HIGH-SPEED NOISE COMPUTING METHOD | $n*\log(n)-n$ | $2n*(2k+1)$ | $n*\log(n)$ |
| 4 | METHOD OF FIRST EMBODIMENT | 0 | $2n*(2k+1)$ | $n(n-1)$ |

FIG.4

| NUM-BER | METHOD | NUMBER OF Zq MULTIPLICA-TIONS | PRECOMPUTA-TION VOLUME | NUMBER OF Zq ADDITIONS |
|---|---|---|---|---|
| 1 | METHOD IN WHICH NO INGENUITY IS APPLIED | $512n$ | $2n$ | $512n$ |
| 2 | HIGH-SPEED COMPUTING METHOD | $10n$ | $2n$ | $10n$ |
| 4 | METHOD OF FIRST EMBODIMENT | 0 | $2n*17$ | $512n$ |
| 5 | METHOD IN WHICH ZERO IS EXCLUDED | 0 | $2n*16$ | $411n$ |
| 6 | $\{\pm 1, \pm 2, \pm 3, \pm 4, \pm 5, \pm 6, \pm 7\}$ | $0.0156n$ | $2n*14$ | $411n$ |
| 7 | $\{\pm 1, \pm 2, \pm 3, \pm 4, \pm 5, \pm 6\}$ | $0.266n$ | $2n*12$ | $411n$ |
| 8 | $\{\pm 1, \pm 2, \pm 3, \pm 4, \pm 5\}$ | $2.14n$ | $2n*10$ | $411n$ |
| 9 | $\{\pm 1, \pm 2, \pm 3, \pm 4\}$ | $10.9n$ | $2n*8$ | $411n$ |

FIG.5

| NUM-BER | METHOD | NUMBER OF Zq MULTIPLICA-TIONS | PRECOMPUTA-TION VOLUME | NUMBER OF Zq ADDITIONS |
|---|---|---|---|---|
| 10 | METHOD OF SECOND EMBODIMENT | 0 | 2n | 512n*8 |
| 11 | METHOD IN WHICH ZERO IS EXCLUDED | 0 | 2n | 804n |
| 12 | METHOD IN WHICH PART IS ACHIEVED BY ADDITIONS | 2.14n | 2n | 793n |

FIG.6

| NUM-BER | METHOD | NUMBER OF Zq MULTIPLICA-TIONS | PRECOMPUTA-TION VOLUME | NUMBER OF Zq ADDITIONS |
|---|---|---|---|---|
| 13 | {±1, ±2, ±3, ±4, ±5, ±6, ±7} | 0 | 2n*14 | 412n |
| 14 | {±1, ±2, ±3, ±4, ±5, ±6} | 0 | 2n*12 | 413n |
| 15 | {±1, ±2, ±3, ±4, ±5} | 0 | 2n*10 | 422n |
| 16 | {±1, ±2, ±3, ±4} | 0 | 2n*8 | 457n |
| 17 | {±1, ±2, ±3} | 0 | 2n*6 | 543n |
| 18 | {±1, ±2} | 0 | 2n*4 | 679n |
| 19 | {±1} | 0 | 2n*2 | 804n |

FIG.7

| NUM-BER | METHOD | NUMBER OF Zq MULTIPLICA-TIONS | PRECOMPUTA-TION VOLUME | NUMBER OF Zq ADDITIONS |
|---|---|---|---|---|
| 20 | METHOD IN WHICH ZERO IS EXCLUDED | 0 | 2n*8 | 411n |
| 21 | {1, 2, 3, 4, 5, 6, 7} | 0 | 2n*7 | 412n |
| 22 | {1, 2, 3, 4, 5, 6} | 0 | 2n*6 | 413n |
| 23 | {1, 2, 3, 4, 5} | 0 | 2n*5 | 422n |
| 24 | {1, 2, 3, 4} | 0 | 2n*4 | 457n |
| 25 | {1, 2, 3} | 0 | 2n*3 | 543n |
| 26 | {1, 2} | 0 | 2n*2 | 679n |

FIG.8

| NUM-BER | METHOD | NUMBER OF Zq MULTIPLICA-TIONS | PRECOMPUTA-TION VOLUME | NUMBER OF Zq ADDITIONS |
|---|---|---|---|---|
| 27 | {1, 2, 3, 4, 5, 6, 7} | 0.0156n | 2n*7 | 411n |
| 28 | {1, 2, 3, 4, 5, 6} | 0.266n | 2n*6 | 411n |
| 29 | {1, 2, 3, 4, 5} | 2.14n | 2n*5 | 411n |
| 30 | {1, 2, 3, 4} | 10.9n | 2n*4 | 411n |

FIG.9

NUMBER-THEORETIC TRANSFORM PROCESSING APPARATUS, NUMBER-THEORETIC TRANSFORM PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-038923, filed on Mar. 6, 2020; the entire contents of which are incorporated herein by reference.

FIELD

Embodiments described herein relate generally to a number-theoretic transform processing apparatus, a number-theoretic transform processing method, and a program.

BACKGROUND

In recent years, major IT companies have started research on a quantum computer, which is then rapidly progressing. Realization of a quantum computer that breaks RSA cryptography or elliptic curve cryptography, i.e., public key cryptography widely used at present, would make an information security system using RSA cryptography or elliptic curve cryptography insecure. Then, in preparation for a need of shift from RSA cryptography or elliptic curve cryptography to quantum computer-resistant cryptography (also referred to as quantum computer-resistant public key cryptography or post-quantum cryptography), research and development of quantum computer-resist cryptography such as lattice-based cryptography have been advanced. In processing of lattice-based cryptography, number-theoretic transform in which computations are performed over a polynomial ring is performed.

DETAILED DESCRIPTION

According to an embodiment, a number-theoretic transform processing apparatus for a noise in lattice-based cryptography, includes a processor configured to perform number-theoretic transform of the noise using a precomputation table including a combination of products of one or more elements that belong to a subspace of a finite field Zq and indicate coefficients of the noise, with one or more number-theoretic transform constants.

Hereinafter, embodiments of a number-theoretic transform processing apparatus, a number-theoretic transform processing method, and a program will be described in detail with reference to the accompanying drawings.

First Embodiment

One promising candidate for quantum computer-resistant cryptography is lattice-based cryptography of which security is based on the learning with errors (LWE) problem or the like. For example, candidates for a standardization process of quantum computer-resistant cryptography under consideration by national institute of standards and technology (NIST) include NewHope. The security of those proposals for a standardization process of quantum computer-resistant cryptography is based on the LWE problem over a polynomial ring, such as the ring-LWE problem or the module-LWE problem, and computations are performed over a polynomial ring.

Lattice-based cryptography in which computations are performed over a polynomial ring has a feature in its smaller number of execution cycles for encapsulation and decapsulation in mechanisms for key generation, encryption, decryption, and key encapsulation than that of other lattice-based cryptography, RSA cryptography, or elliptic curve cryptography. Thus, a cryptography processing apparatus according to a first embodiment increases a speed of number-theoretic transform that is main processing in lattice-based cryptography in which computations are performed over a polynomial ring, to strengthen the foregoing feature.

Main processing in lattice-based cryptography in which computations are performed over a polynomial ring is a multiplication over a polynomial ring. Suppose a polynomial ring $Rq=Zg[x]/f(x)$. In this expression, q represents a prime number, a finite field $Zq=Z/qZ=\{0, 1, \ldots, q-1\}$, $Zq[x]$ represents a polynomial with Zq coefficients, and a modulus polynomial $f(x)$ is a polynomial of degree n with Zq coefficients.

An element a of the polynomial ring Rq is a polynomial of degree $(n-1)$ with Zq coefficients. Also an element b of the polynomial ring Rq is a polynomial of degree $(n-1)$ with Zq coefficients. In this case, a multiplication of the element a by the element b of the polynomial ring Rq is an operation of computing a product of a polynomial a and a polynomial b and dividing the product by the modulus polynomial $f(x)$ to obtain a remainder polynomial c. In computations of a product of the polynomial a and the polynomial b, products of coefficients $a_l$ ($i=0, 1, \ldots, (n-1)$) of the polynomial a and coefficients $b_i$ ($i=0, 1, \ldots, (n-1)$) of the polynomial b are computed through $n^2$-time multiplications over the finite field Zq (Zq multiplications).

Examples of a method for speeding up a multiplication over the polynomial ring Rq include number-theoretic transform. Number-theoretic transform allows a product of polynomials to be computed through computations of a product of coefficients of the same degree (that is, n-time Zq multiplications). Regarding a modulus polynomial $f(x)=x^n+1$, modulus q, when 2n divides (q−1), number-theoretic transform of (2n|(q−1)) can be performed in the same manner as discrete Fourier transform. Supposing that a degree n is the power of 2, computations can be performed by a high-speed computing method and Zq multiplications for number-theoretic transform are performed $O(n*\log(n))$ times. In other words, number-theoretic transform reduces a cost for multiplications over the polynomial ring Rq from $O(n^2)$-time Zq multiplications to $O(n*\log(n))$-time Zq multiplications.

One idea for further speeding up a multiplication over the polynomial ring Rq is to speed up number-theoretic transform. In number-theoretic transform of the polynomial a, products of the powers of a number-theoretic transform constant and coefficients al (i=0, 1, . . . , (n−1)) of the polynomial a are computed through Zq multiplications. A method of precomputing the powers of a number-theoretic transform constant has already been shown in NewHope Algorithm Specifications and Supporting Documentation (NIST PQC Round 2), [online], searched for on Feb. 17, 2020, on the Internet <URL: https://csrc.nist.gov/CSRC/media/Projects/Post-Quantum-Cryptogrphy/documents/round-2/submissions/NewHope-Round2.zip>.

In lattice-based cryptography in which computations are performed over the polynomial ring Rq, a multiplication of the polynomial a by a noise e is inherently essential. In a case where the polynomial a is random, the polynomial a remains random even though having been subjected to number-theoretic transform. A method of omitting number-theoretic transform of the random polynomial a has already been shown in NewHope Algorithm Specifications and Supporting Documentation (NIST PQC Round 2), [online], searched for on Feb. 17, 2020, on the Internet <URL: https://csrc.nist.gov/CSRC/media/Projects/Post-Quantum-Cryptogrphy/documents/round-2/submissions/NewHope-Round2.zip>. Meanwhile, the noise e is subjected to number-theoretic transform as a polynomial e of the polynomial ring Rq according to an ordinary method.

The noise e is an element e over the polynomial ring Rq over which its coefficients $e_i$ (i=0, 1, . . . (n−1)) are obtained according to a certain distribution. Each of the coefficients $e_i$ (i=0, 1, . . . , (n−1)) has a value whose absolute value is a constrained and small value. Further, a distribution of the coefficients $e_i$ (i=0, 1, . . . , (n−1)) is a discrete Gaussian distribution, a uniform distribution, or the like.

In the first embodiment, a cryptography processing apparatus that speeds up number-theoretic transform of a noise will be described. Note that in the first embodiment, not only a number-theoretic transform constant, but also the power of a number-theoretic transform constant, will be referred to as a number-theoretic transform constant for the sake of simplicity in some cases.

Example of Functional Configuration

Figure 1:
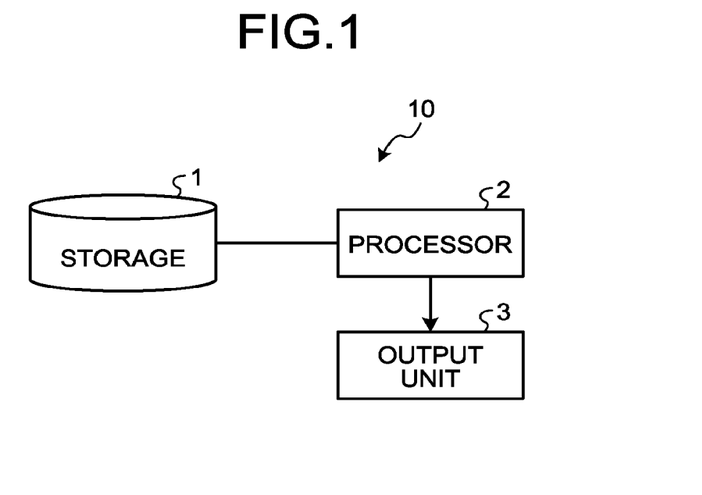
FIG. 1 is a diagram illustrating an example of a functional configuration of a number-theoretic transform processing apparatus according to a first embodiment.

FIG. 1 is a diagram illustrating an example of a functional configuration of a number-theoretic transform processing apparatus 10 according to the first embodiment. The number-theoretic transform processing apparatus 10 of the first embodiment includes a storage 1, a processor 2, and an output unit 3.

The storage 1 stores a precomputation table therein. The precomputation table includes a precomputed value of a product included in computations of number-theoretic transform processing. Details of the precomputation table will be given later.

The processor 2 performs number-theoretic transform of a noise in lattice-based cryptography using the precomputation table.

The output unit 3 outputs a result of number-theoretic transform performed by the processor 2.

Example of Number-Theoretic Transform Processing Method

Figure 2:
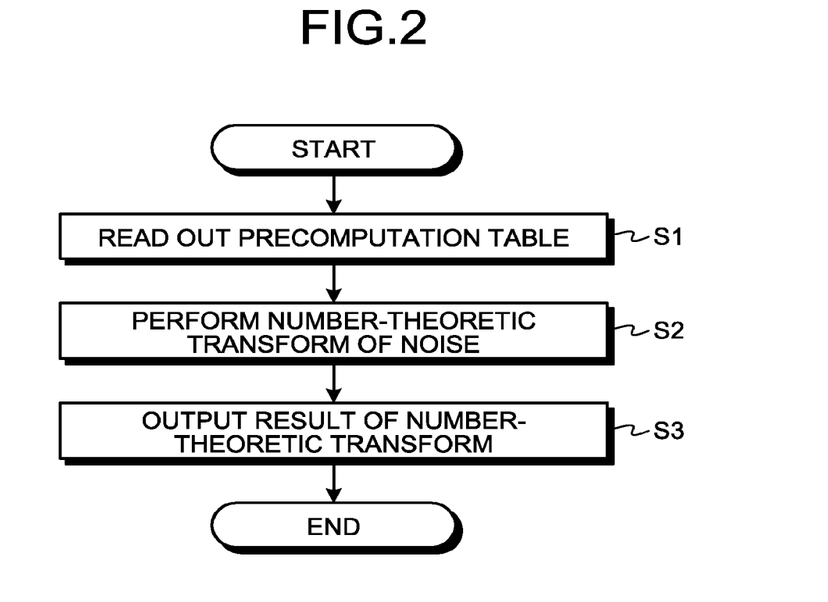
FIG. 2 is a flowchart illustrating an example of a number-theoretic transform processing method according to the first embodiment.

FIG. 2 is a flowchart illustrating an example of a number-theoretic transform processing method according to the first embodiment. First, the processor 2 reads out the precomputation table from the storage 1 (step S1). Secondly, the processor 2 performs number-theoretic transform of a noise in lattice-based cryptography using the precomputation table (step S2). Subsequently, the output unit 3 outputs a result of number-theoretic transform obtained through number-theoretic transform in the step S2 (step S3).

Next, details and variations of number-theoretic transform processing of a noise using a precomputation table will be described.

Number-theoretic transform constants ω and γ are set so as to satisfy $\omega^n=1$ (mod q) and $\gamma^2=\omega$ (mod q). The polynomial a is set as in the following expression (1).

$$a = \sum_{i=0}^{n-1} a_i x^i \qquad (1)$$

Number-theoretic transform NTT(a) of the polynomial a is set as in the following expression (2).

$$NTT(a) = \hat{a} = \sum_{i=0}^{n-1} \hat{a}_i x^i \qquad (2)$$

In this case, a coefficient of the polynomial NTT(a) is expressed by the following expression (3).

$$\hat{a}_i = \sum_{j=0}^{n-1} \gamma^j a_j \omega^{ij} \qquad (3)$$

Figure 3:
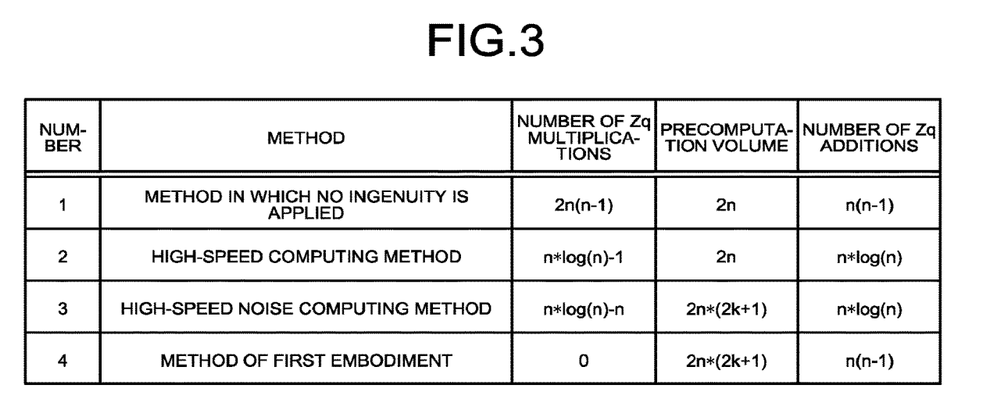
FIG. 3 is a diagram for explaining examples of the number-theoretic transform processing method according to the first embodiment.

FIG. 3 is a diagram for explaining examples of a computing method.

First Method

A first method is a method in which no ingenuity is applied. Regarding the first method, there will be described an example in which the powers yl (i=2, 3, . . . , (n−1)) of γ and the powers $\omega^i$ (i=2, 3, . . . , (n−1)) of ω are precomputed in preparation for computations of the foregoing expression (3) of number-theoretic transform.

When the foregoing expression (3) of number-theoretic transform is computed as it is, no Zq multiplication is performed at j=0 because $\gamma^0=\omega^0=1$, and Zq multiplications are performed twice ($\gamma^j a_j$ and $a_j \omega^{ij}$) for each of j=1, 2, . . . , (n−1). Thus, Zq multiplications are performed 2n(n−1) times in number-theoretic transform as a whole. In other words, Zq multiplications are performed $O(n^2)$ times. Hence, computing the foregoing expression (3) of number-theoretic transform as it is cannot speed up number-theoretic transform through multiplications over the polynomial ring Rq even with precomputation of the powers $\gamma^j$=2, 3, ..., (n−1)) of $\gamma$ and the powers $\omega^i$ (i=2, 3, ..., (n−1)) of $\omega$.

Second Method

A second method is a method using a high-speed computing method. Setting the degree n to the power of 2 enables high-speed computing of the foregoing expression (3) of number-theoretic transform. In precomputation of products $u_j=\gamma^j*a_j$ of the powers $\gamma^j$ of $\gamma$ and the coefficients $a_j$ as preprocessing, no Zq multiplication is performed at j=0 and a Zq multiplication is performed once for each j=1, 2, ..., (n−1).

Subsequently, in the same manner as in path computations in high-speed Fourier transform, when $u_j=u_j+u_{(j+n/2)}$ at j=0, 1, ... (n/2−1) and $u_j=u_{(j-n/2)}+\omega^{(n/2)}*u_j$ at j=n/2, ..., (n−1) in a first path, Zq multiplications are performed n/2 times. In a second path, when $u_j=u_j+u_{(j\ n/4)}$ at j=0, 1, ..., n/4−1, $u_j=u_{(j-n/4)}+\omega^{(n/2)}*u_j$ at j=n/4, ..., n/2−1, $u_j=u_j+\omega^{(n/4)}*u_{(j+n/4)}$ at j=n/2, ..., 3n/4−1, and $u_j=u_{(j-n/4)}+\omega^{(3n/4)}*u_j$ at j=3n/4, ..., (n−1), Zq multiplications are performed 3n/4 times.

In the same manner as described above, Zq multiplications are performed $(n-n/2^i)$ times in an i-th path. The number of paths is equal to log(n), and thus Zq multiplications are performed the number of times equal to a result of subtracting one from (n−1)+n/2+3n/4+ ... +(n−1)≈(n−1)+n*log(n)−n=n*log(n) in a high-speed computing method. That is, in a case where a high-speed computing method for number-theoretic transform is used, Zq multiplications are performed O(n*log(n)) times, thereby achieving speed up through multiplications over the polynomial ring Rq.

Next, a case where number-theoretic transform of the noise e is further speeded up will be described.

Third Method

A third method is a method using a high-speed computing method with utilization of a property of the noise e. A property by which each noise coefficient $e_i$ (i=0, 1, ..., (n−1)) has a value whose absolute value is a constrained and small value is applied to path computations corresponding to a high-speed computing method. The noise coefficients $e_i$ are indicated by (2k+1) elements included in a set {−k, −(k−1), ..., 0, 1, ..., k}, for example. Further, in a case where the noise coefficients $e_i$ are indicated by positive numbers, for example, the noise coefficients $e_i$ are indicated by (2k+1) elements included in a set {q−k, q−(k−1), ..., 0, 1, ..., k}, for example. In this regard, k represents a positive number (k=8, for example) and q represents a number satisfying k<<q.

Supposing that possible values of the noise coefficients e are constrained to 2k+1 in which k is a positive integer, products $u_j=\gamma_j*e_j$ of the powers $\gamma^j$ of $\gamma$ and the coefficients $e_j$ have n*(2k+1) possible values. Precomputing the n*(2k+1) possible values eliminates a need for a Zq multiplication in preprocessing. Also the products $\omega^{(n/2)}*u_j$ in the first path have n*(2k+1) possible values because $\omega^{(n/2)}$ has one possible value. Precomputing the n*(2k+1) possible values also eliminates a need for a Zq multiplication in the first path. In and after the second path, supposing that Zq multiplications are performed n times, Zq multiplications are performed (n*log(n)−n) times, thereby speeding up number-theoretical transform processing.

Fourth Method

A fourth method is a number-theoretic transform processing method according to the first embodiment. The above-described high-speed noise computing method (the third method) receives little benefits from speeding-up in relation to the volume of precomputation. There is conceived a method of computing at a higher speed with the same volume of precomputation. According to the above-described method, the power $\gamma^j$ of $\gamma$ and the power $\omega^i$ of $\omega$ are individually considered in computing a product. However, as $\gamma^2=\omega$(mod q), $\gamma^j*\omega^{(ij)}$ in the foregoing expression (3) are actually equal to values resulted from multiplications of the power $\omega^i$ of $\omega$ and the power $\omega^i$ of $\omega$ by $\gamma$. When the foregoing expression (3) is written down by taking a degree n=4 as an example, the following expression (4) is provided. The powers of a number-theoretic transform constant have 2n possible values of {1, $\omega$, $\omega^2$, $\omega^3$} and {$\gamma$, $\gamma\omega$, $\gamma\omega^2$, $\gamma\omega^3$}.

$$\begin{cases} \hat{a}_0 = a_0 + \gamma a_1 + \omega a_2 + \gamma\omega a_3 \\ \hat{a}_1 = a_0 + \gamma\omega a_1 + a_2 + \gamma a_3 \\ \hat{a}_2 = a_0 + \gamma\omega^2 a_1 + \omega^2 a_2 + \gamma\omega^3 a_3 \\ \hat{a}_3 = a_0 + \gamma\omega^3 a_1 + \omega^3 a_2 + \gamma\omega^2 a_3 \end{cases} \quad (4)$$

The property of each of the noise coefficients $e_i$=0, 1, ... (n−1)) by which it has a value whose absolute value is a constrained and small value is applied to an expression generalized with n, of the foregoing expression (4) of number-theoretic transform. Supposing that noise coefficients are constrained to (2k+1) possible values in which k is a positive integer, products of the powers of a number-theoretic transform constant and the coefficients $e_j$ have 2n*(2k+1) possible values. In the number-theoretic transform processing apparatus 10 of the first embodiment, those 2n*(2k+1) possible values having been precomputed are stored in the precomputation table. The processor 2 performs number-theoretic transform of a noise using the precomputation table, which eliminates a need for a Zq multiplication in computations of the generalized expression using n, of the foregoing expression (4).

As described above, in the number-theoretic transform processing apparatus 10 according to the first embodiment, the processor 2 performs number-theoretic transform of a noise using a precomputation table including a combination of products of one or more elements that belong to a subspace of the finite field Zq and indicate coefficients of the noise e and one or more number-theoretic transform constants ({1, $\omega$, $\omega^2$, $\omega^3$} and {$\gamma$, $\gamma\omega$, $\gamma\omega^2$, $\gamma\omega$} at n=4, for example, in the first embodiment).

Therefore, the number-theoretic transform processing apparatus 10 according to the first embodiment can reduce the number of Zq multiplications in number-theoretic transform of the noise e over the polynomial ring Rq, thereby performing number-theoretic transform processing at a higher speed. This can reduce the number of execution cycles for key generation, the number of execution cycles for encryption in public key cryptography, the number of execution cycles for decryption in public key cryptography, the number of execution cycles for encapsulation in the key encapsulation mechanism, and the number of execution cycles for decapsulation in the key encapsulation mechanism in lattice-based cryptography in which computations are performed over the polynomial ring Rq.

Modification of the First Embodiment

Next, a modification of the first embodiment will be described. In the description of the modification, the same explanation as in the first embodiment is omitted, and differences from the first embodiment will be described. The modification deals with a case where the size of a precomputation table is reduced.

Figure 4:
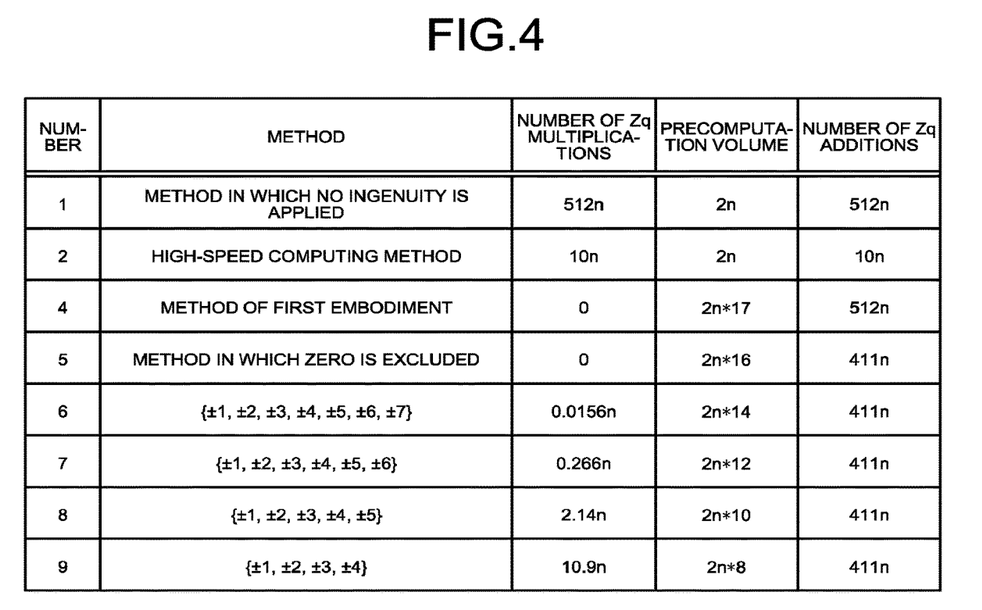
FIG. 4 is a diagram for explaining a modification of the number-theoretic transform processing method according to the first embodiment.

FIG. 4 is a diagram for explaining a modification of the number-theoretic transform processing method of the first embodiment. Fifth to ninth methods correspond to the modification of the first embodiment.

Fifth Method

A fifth method is a method in which zero is excluded. It is supposed that the coefficients of the noise e are constrained to (2k+1) possible values and zero is included in (2k+1) elements. A product of the power $\omega^i$ of $\omega$ and zero is equal to zero. Further, a product of a value resulted from a multiplication of the power $\omega^i$ of $\omega$ by $\gamma$ and zero is equal to zero. In this case, a precomputation table, from which a product of the coefficient "zero" of the noise e and a number-theoretic transform constant is excluded, has a size of 2n*2k.

Possible values of coefficients of the noise e are set so as to follow a centered binomial distribution (a binomial distribution in which a maximum value appears at the origin "zero") that is a good approximation to a discrete Gaussian distribution. By not including a value that is less possible as a coefficient than a threshold value in precomputation, it is possible to reduce the volume of precomputation while keeping the number of Zq multiplications small. For example, when the degree n=512 and k=8, possible values as coefficients are excluded from precomputation in ascending numeric order of possibility of their being used as coefficients. This results in sixth to ninth methods in FIG. 4.

Note that in FIG. 4, the number of Zq multiplications in FIG. 1 is expressed on a given order and numeric values n=512 and k=8 are substituted into the number of Zq multiplications expressed on the given order. For example, the number of Zq multiplications 2n(n−1) in the first method is $O(n^2)$, which is expressed as "512n".

Sixth Method

A precomputation table in a sixth method includes only products of coefficients {±1, ±2, ±3, ±4, ±5, ±6, ±7} of the noise e and number-theoretic transform constants. Note that a notation "{±1, ±2, ±3, ±4, ±5, ±6, ±7}" represents a set of noises e{q−7, q−6, q−5, q−4, q−3, q−2, q−1, 1, 2, 3, 4, 5, 6, 7}. Additionally, the same notations in and after a seventh method will be used in the same manner as in the sixth method.

In the sixth method, products of coefficients {q−8, 0, 8} of the noise e and number-theoretic transform constants are excluded from the precomputation table.

Seventh Method

A precomputation in a seventh method includes only products of coefficients {±1, ±2, ±3, ±4, ±5, ±6} of the noise e and number-theoretic transform constants. In the seventh method, products of coefficients {q−8, q−7, 0, 7, 8} of the noise e and number-theoretic transform constants are excluded from the precomputation table.

Eighth Method

A precomputation in an eighth method includes only products of coefficients {±1, ±2, ±3, ±4, ±5} of the noise e and number-theoretic transform constants. In the eighth method, products of coefficients {q−8, q−7, q−6, 6, 7, 8} of the noise e and number-theoretic transform constants are excluded from the precomputation table.

Ninth Method

A precomputation of a ninth method includes only products of coefficients {±1, ±2, ±3, ±4} of the noise e and number-theoretic transform constants. In the ninth method, products of coefficients {q−8, q−7, q−6, q−5, 5, 6, 7, 8} of the noise e and number-theoretic transform constants are excluded from the precomputation table. Additionally, regarding the ninth method, in which both of the number of Zq multiplications and the volume of precomputation are large, the second method (high-speed computing method), for example, is more efficient than the ninth method.

Suppose a case where 512A<10M+10A in which M represents a computing cost for Zq multiplications and A represents a computing cost for Zq additions (in other words, in a case where 50A<M, which means that a computing cost for Zq multiplications is 50 times higher than a computing cost for Zq additions). In such a case, the fourth method (the number-theoretic transform processing method of the first embodiment), for example, is faster than the second method (high-speed computing method).

Additionally, though a case where n=512 and k=8 is illustrated as an example in FIG. 4 for the sake of explanation, the same holds true for cases other than the case where n=512 and k=8.

Second Embodiment

Next, a second embodiment will be described. In the description of the second embodiment, the same explanation as in the first embodiment is omitted, and differences from the first embodiment will be described. The second embodiment deals with a case of speeding up number-theoretic transform processing of a noise e by achieving Zq multiplications through Zq additions.

It is supposed that each coefficient of the noise e has a value whose absolute value is a constrained and small value, the maximum value is k, and the minimum value is −k. It is noted that, actually, a negative value is expressed as "q−k" with mod q.

Figure 5:
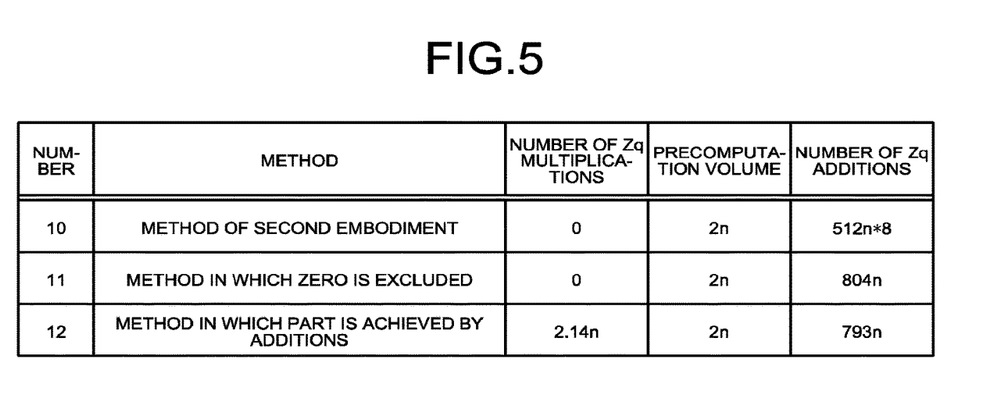
FIG. 5 is a diagram for explaining examples of a number-theoretic transform processing method according to a second embodiment.

FIG. 5 is a diagram for explaining an example of a number-theoretic transform processing method according to the second embodiment. Possible values of coefficients of the noise e are set so as to follow a centered binomial distribution. In FIG. 5, in the same manner as in FIG. 4, the number of Zq multiplications and the number of Zq additions are expressed on a given order and numeric values n=512 and k=8 are substituted into the number of Zq multiplications expressed on the given order.

For example, to compute a product of a coefficient "(q−k)" of the noise e and a number-theoretic transform constant $\omega$, a Zq multiplication can be replaced by a Zq subtraction in the following manner.

$$(q-k) \times \omega = q\omega - k\omega$$
$$= 0 - k\omega (\mathrm{mod}\ q)$$
$$= -\omega - \omega \ldots - \omega (k - \text{time subtractions of } \omega).$$

It is noted that, the number of additions (subtractions) is estimated based on the fact that the number of additions (subtractions) to be performed is smaller for the smaller value whose absolute value is constrained. Depending on a value, a product can be achieved by the much smaller number of additions (subtractions).

Tenth Method

A tenth method is a number-theoretic transform processing method according to the second embodiment. In products of the powers of a number-theoretic transform constant in a generalized expression using n, of the foregoing expression (4) of number-theoretic transform, and coefficients el, when Zq multiplications are performed through Zq additions, Zq additions are performed k*(n−1)*n times. However, in a case where a coefficient is a negative value, Zq subtractions are performed. Additionally, in the description of the second embodiment, also the number of Zq subtractions is included in the number of Zq additions in FIG.

Eleventh Method

An eleventh method is a method in which zero is excluded. It is supposed that coefficients of the noise e are constrained to (2k+1) possible values and zero is included in (2k+1) elements. When a coefficient has a value of "zero", a product of the power of a number-theoretic transform constant and the coefficient $e_j$ is equal to 0. Thus, the number of Zq additions can be reduced by omitting the Zq addition.

Twelfth Method

A twelfth method is a method in which a part is achieved by additions. According to the twelfth method, a part of products of the powers of a number-theoretic transform constant and the coefficients $e_j$ is achieved by additions and the other part is achieved by multiplications. For example, the processor 2 achieves products of coefficients {±1, ±2, ±3, ±4, ±5} of the noise e and number-theoretic transform constants by additions and achieves products of coefficients {±6±7, ±8} of the noise e and number-theoretic transform constants by multiplications. Additionally, under conditions in which a cost for Zq multiplications and a cost for Zq additions are in a ratio that makes the number-theoretic transform processing method of the first embodiment (the fourth method) faster than the high-speed computing method (the second method), the twelfth method in which a part is achieved by additions is inefficient.

Third Embodiment

Next, a third embodiment will be described. In the description of the third embodiment, the same explanation as in the first embodiment is omitted, and differences from the first embodiment will be described. The third embodiment deals with a case where the first embodiment and the second embodiment are combined.

More specifically, according to the third embodiment, a part of products of the powers of a number-theoretic transform constant and coefficients $e_j$ of a noise e are achieved by additions and the other part of the products of the powers of the number-theoretic transform constant and the coefficients $e_j$ of the noise e are achieved by using a precomputation table. In other words, according to the third embodiment, products of number-theoretic transform constants and coefficients of the noise e include a first product stored in a precomputation table and a second product not stored in a precomputation table. A processor 2 reads out the first product from the precomputation table and computes the second product by performing additions or subtractions over a finite field Zq plural times.

Figure 6:
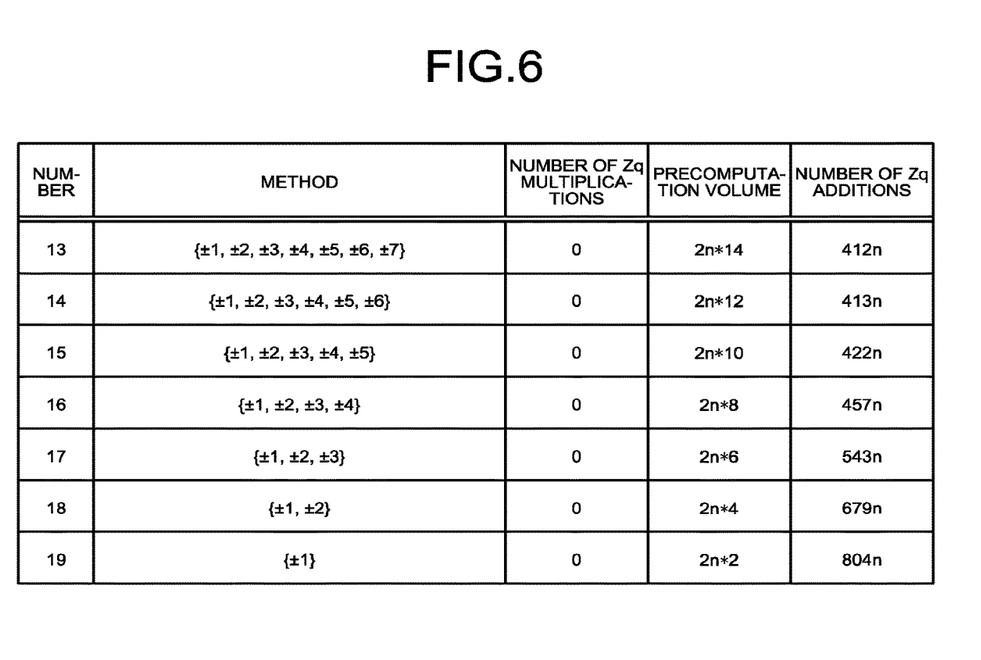
FIG. 6 is a diagram for explaining examples of a number-theoretic transform processing method according to a third embodiment.

FIG. 6 is a diagram for explaining an example of a number-theoretic transform processing method according to the third embodiment. Possible values of coefficients of the noise e are set so as to follow a centered binomial distribution.

Thirteenth Method

A precomputation table in a thirteenth method is identical to the precomputation table in the sixth method. More specifically, in the thirteenth method, products of coefficients {q−8, 0, 8} of the noise e and number-theoretic transform constants are excluded from the precomputation table. In the thirteenth method, products of coefficients {q−8, 0, 8} of the noise e and number-theoretic transform constants are achieved not by Zq multiplications, but by Zq additions.

Fourteenth Method

A precomputation table in a fourteenth method is identical to the precomputation table in the seventh method. More specifically, in the fourteenth method, products of coefficients {q−8, q−7, 0, 7, 8} of the noise e and number-theoretic transform constants are excluded from the precomputation table. In the fourteenth method, products of coefficients {q−8, q−7, 0, 7, 8} of the noise e and number-theoretic transform constants are achieved not by Zq multiplications, but by Zq additions.

Fifteenth Method

A precomputation table in a fifteenth method is identical to the precomputation table in the eighth method. More specifically, in the fifteenth method, products of coefficients {q−8, q−7, q−6, 0, 6, 7, 8} of the noise e and number-theoretic transform constants are excluded from the precomputation table. In the fifteenth method, products of coefficients {q−8, q−7, q−6, 0, 6, 7, 8} of the noise e and number-theoretic transform constants are achieved not by Zq multiplications, but by Zq additions.

Sixteenth Method

A precomputation table in a sixteenth method is identical to the precomputation table in the ninth method. More specifically, in the sixteenth method, products of coefficients {q−8, q−7, q−6, q−5, 0, 5, 6, 7, 8} of the noise e and number-theoretic transform constants are excluded from the precomputation table. In the sixteenth method, products of coefficients {q−8, q−7, q−6, q−5, 5, 6, 7, 8} of the noise e and number-theoretic transform constants are achieved not by Zq multiplications, but by Zq additions.

Seventeenth Method

A precomputation table in a seventeenth method includes only products of coefficients {±1, ±2, ±3} of the noise e and number-theoretic transform constants. In other words, in the seventeenth method, products of coefficients {q−8, q−7, q−6, q−5, q−4, 0, 4, 5, 6, 7, 8} of the noise e and number-theoretic transform constants are excluded from the precomputation table. In the seventeenth method, products of coefficients {q−8, q−7, q−6, q−5, q−4, 0, 4, 5, 6, 7, 8} of the noise e and number-theoretic transform constants are achieved not by Zq multiplications, but by Zq additions.

Eighteenth Method

A precomputation table in an eighteenth method includes only products of coefficients {±1, ±2} of the noise e and number-theoretic transform constants. In other words, in the eighteenth method, products of coefficients {q−8, q−7, q 6, q−5, q−4, q−3, 0, 3, 4, 5, 6, 7, 8} of the noise e and number-theoretic transform constants are excluded from the precomputation table. In the eighteenth method, products of the coefficients {q−8, q−7, q−6, q−5, q−4, q−3, 3, 4, 5, 6, 7, 8} of the noise e and number-theoretic transform constants are achieved not by Zq multiplications, but by Zq additions.

Nineteenth Method

A precomputation table in a nineteenth method includes only products of coefficients {±1} of the noise e and number-theoretic transform constants. In other words, in the nineteenth method, products of coefficients {q−8, q−7, q 6, q−5, q−4, q−3, q−2, 0, 2, 3, 4, 5, 6, 7, 8} of the noise e and number-theoretic transform constants are excluded from the precomputation table. In the nineteenth method, products of coefficients {q−8, q−7, q−6, q−5, q−4, q−3, q−2, 0, 2, 3, 4, 5, 6, 7, 8} of the noise e and number-theoretic transform constants are achieved not by Zq multiplications, but by Zq additions.

More specifically, in the nineteenth method, the processor 2 precomputes products of coefficients {q−1, 1} of the noise e and number-theoretic transform constants. The precomputation of the products of {q−1, 1} and number-theoretic transform constants in the nineteenth method provides just the powers of the number-theoretic transform constant and products of the powers of the number-theoretic transform constant and "−1". The method in which just the powers of a number-theoretic transform constant are subjected to Zq subtractions (the eleventh method in which zero is excluded) is more efficient than the method in which products of the powers of a number-theoretic transform constant and "−1" are read out from the precomputation table and are subjected to Zq additions, because of its precomputation volume of 2n.

First Modification of Third Embodiment

Figure 7:
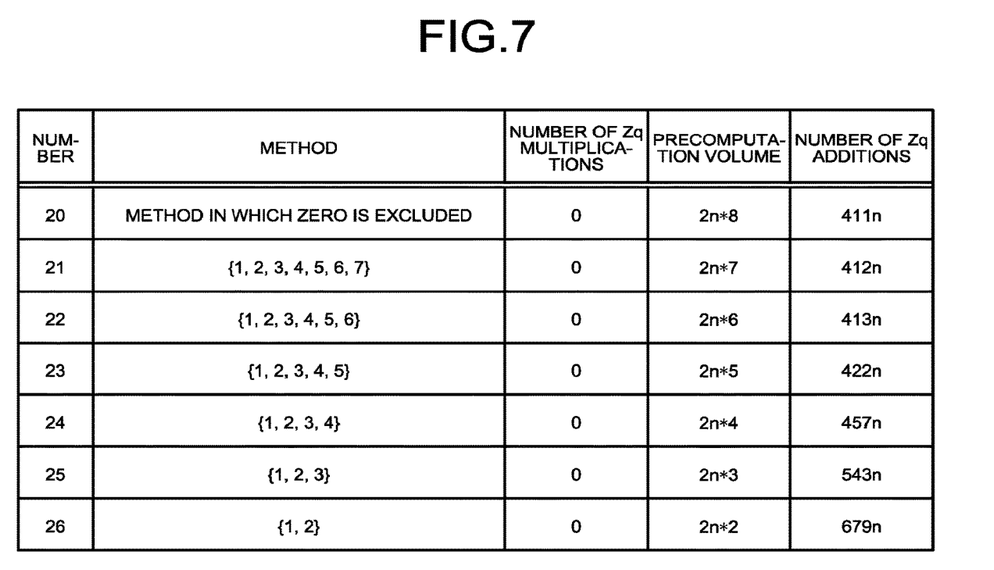
FIG. 7 is a diagram for explaining a first modification of the number-theoretic transform processing method according to the third embodiment.

Next, a first modification of the third embodiment will be described. In the description of the first modification, the same explanation as in the third embodiment is omitted, and differences from the third embodiment will be described. In the first modification, when a coefficient of the noise e is equal to zero, the processor 2 neither performs a Zq addition nor uses a precomputation table. Further, when the sign of a coefficient of the noise e indicates a minus value, the processor 2 obtains an absolute value to convert the minus value to a plus value, and performs precomputation of the plus value through Zq subtractions.

FIG. 7 is a diagram for explaining the first modification of the number-theoretic transform processing method according to the third embodiment. An example in FIG. 7, like the third embodiment, illustrates a case where k=8. A precomputation table in each of twentieth to twenty-sixth methods includes only one of each pair of products having values that are converted to each other by changing between plus and minus signs. In the example in FIG. 7, only plus values are stored, which can reduce the size of a precomputation table to one-half the precomputation table in a case where both of plus and minus values are held.

Twentieth Method

A twentieth method is a method in which zero is excluded. More specifically, in the twentieth method, products of coefficients {1, 2, 3, 4, 5, 6, 7, 8} of the noise e and number-theoretic transform constants are stored in a precomputation table. The processor achieves products of coefficients {1, 2, 3, 4, 5, 6, 7, 8} of the noise e and number-theoretic transform constants not by Zq multiplications, but by Zq additions (or Zq subtractions), using the precomputation table.

Twenty-First Method

In a twenty-first method, products of coefficients {1, 2, 3, 4, 5, 6, 7} of the noise e and number-theoretic transform constants are stored in a precomputation table. The processor achieves products of coefficients {1, 2, 3, 4, 5, 6, 7} of the noise e and number-theoretic transform constants not by Zq multiplications, but by Zq additions (or Zq subtractions), using the precomputation table.

Twenty-Second Method

In a twenty-second method, products of coefficients {1, 2, 3, 4, 5, 6} of the noise e and number-theoretic transform constants are stored in a precomputation table. The processor achieves products of coefficients {1, 2, 3, 4, 5, 6} of the noise e and number-theoretic transform constants not by Zq multiplications, but by Zq additions (or Zq subtractions), using the precomputation table.

Twenty-Third Method

In a twenty-third method, products of coefficients {1, 2, 3, 4, 5} of the noise e and number-theoretic transform constants are stored in a precomputation table. The processor achieves products of coefficients {1, 2, 3, 4, 5} of the noise e and number-theoretic transform constants not by Zq multiplications, but by Zq additions (or Zq subtractions), using the precomputation table.

Twenty-Fourth Method

In a twenty-fourth method, products of coefficients {1, 2, 3, 4} of the noise e and number-theoretic transform constants are stored in a precomputation table. The processor achieves products of coefficients {1, 2, 3, 4} of the noise e and number-theoretic transform constants not by Zq multiplications, but by Zq additions (or Zq subtractions), using the precomputation table.

Twenty-Fifth Method

In a twenty-fifth method, products of coefficients {1, 2, 3} of the noise e and number-theoretic transform constants are stored in a precomputation table. The processor achieves products of coefficients {1, 2, 3} of the noise e and number-theoretic transform constants not by Zq multiplications, but by Zq additions (or Zq subtractions), using the precomputation table.

Twenty-Sixth Method

In a twenty-sixth method, products of coefficients {1, 2} of the noise e and number-theoretic transform constants are stored in a precomputation table. The processor achieves products of coefficients {1, 2} of the noise e and number-theoretic transform constants not by Zq multiplications, but by Zq additions (or Zq subtractions), using the precomputation table.

Additionally, precomputing products of a coefficient {1} of the noise e and number-theoretic transform constants can be translated as holding only the powers of a number-theoretic transform constant in a precomputation table. Thus, such a case in which products of the coefficient {1} of the noise e and number-theoretic transform constants are precomputed corresponds to the eleventh method.

As for the examples in FIGS. 5 to 7, the twentieth method (a method in which zero is excluded) incurs the lowest computing cost among the tenth to twenty-sixth methods.

Second Modification of the Third Embodiment

Next, a second modification of the third embodiment will be described. In the description of the second modification, the same explanation as in the third embodiment is omitted, and differences from the third embodiment will be described. The second modification deals with a case where the processor 2 achieves a part of products of the powers of a number-theoretic transform constant and the coefficients e of the noise e by precomputation, achieves another part by additions, and achieves the other part by multiplications.

Figure 8:
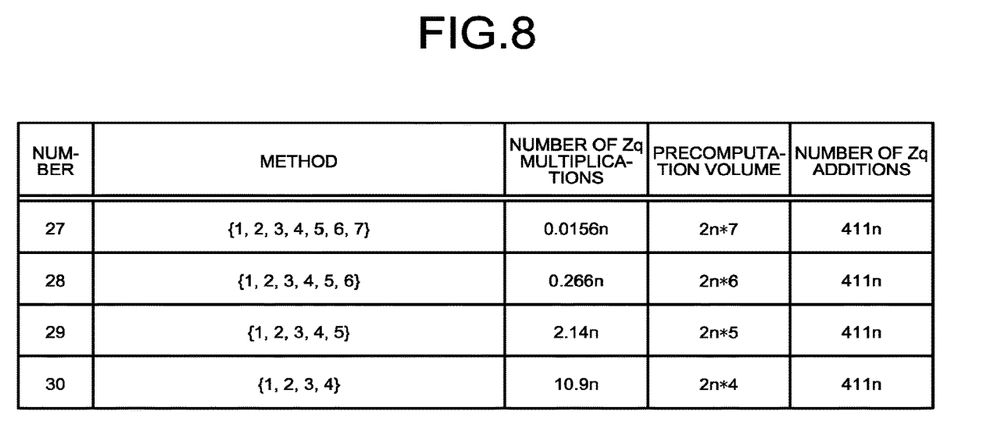
FIG. 8 is a diagram for explaining a second modification of the number-theoretic transform processing method according to the third embodiment.

In the second modification, possible values of the coefficients e of the noise are set so as to follow a centered binomial distribution. The processor 2 stores products of the noise e's coefficients that occur at a higher frequency than a threshold frequency of occurrence, for example, and number-theoretic transform constants into a precomputation table. In other words, the precomputation table of the second modification includes a combination of products of one or more elements that occur as coefficients of the noise e at a higher frequency than a threshold frequency of occurrence among elements belonging to a subspace of the finite field Zq, and one or more number-theoretic transform constants.

Further, in the second modification, in a case where a computing cost for achieving Zq multiplications by Zq additions to compute a given product of a coefficient of a noise e and a number transform constant is higher than a threshold cost, for example, the processor 2 computes the given product by Zq multiplications.

FIG. 8 is a diagram for explaining the second modification of the number-theoretic transform processing method according to the third embodiment. Twenty-seventh to thirtieth methods in FIG. 8 are more efficient than the sixth to ninth methods in FIG. 4 in terms of their smaller sizes of precomputation tables. However, the thirtieth method, in which both of the number of Zq multiplications and the size of a precomputation table are larger than those in the second method (the high-speed computing method), is inefficient.

Lastly, an example of a hardware configuration of the number-theoretic transform processing apparatus 10 according to the first embodiment and the second embodiment will be described.

Example of Hardware Configuration

Figure 9:
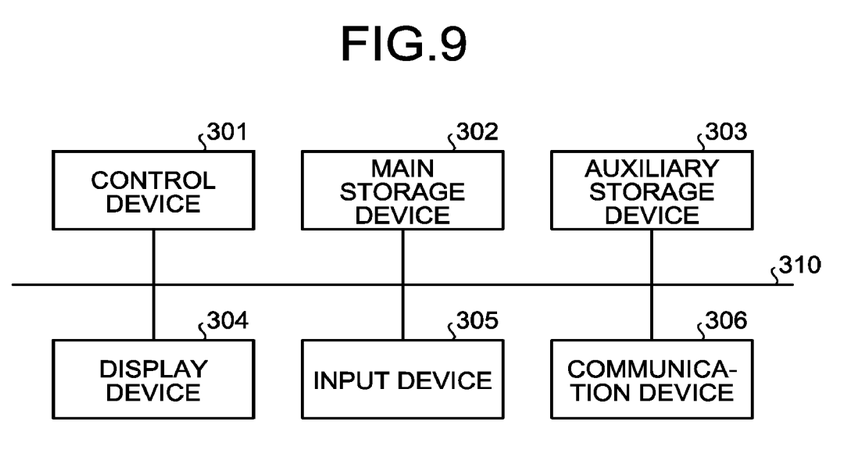
FIG. 9 is a diagram illustrating an example of a hardware configuration for the number-theoretic transform processing apparatus according to the first to third embodiments.

FIG. 9 is a diagram illustrating an example of a hardware configuration of the number-theoretic transform processing apparatus 10 according to the first embodiment and the second embodiment.

The number-theoretic transform processing apparatus 10 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a program read out from the auxiliary storage device 303 into the main storage device 302. The main storage device 302 is a memory such as a read-only memory (ROM) or a random-access memory (RAM). The auxiliary storage device 303 is a hard disk drive (HDD), a solid-state drive (SDD), a memory card, or the like.

The display device 304 displays information to be displayed. The display device 304 is a liquid crystal display or the like, for example. The input device 305 is an Interface for operating a computer. The input device 305 is a keyboard, a mouse, or the like, for example. In a case where a computer is a smart device such as a smartphone or a tablet terminal, a touch panel, for example, serves as the display device 304 and the input device 305. The communication device 306 is an interface for communicating with another apparatus.

A program executed in a computer is recorded in an installable-format file or an executable-format file on a computer-readable storage medium such as a CD-ROM, a memory card, a CD-R, or a digital versatile disc (DVD) and is provided as a computer program product.

Alternatively, there may be formed a configuration in which a program executed in a computer is stored on a computer connected to a network such as the Internet and is provided by being downloaded via the network. Further alternatively, there may be formed a configuration in which a program executed in a computer is provided via a network such as the Internet without being downloaded.

Moreover, there may be formed a configuration in which a program executed in a computer previously loaded into a ROM or the like is provided.

A program executed in a computer has a module configuration including functional blocks that can be implemented also by a program, in the functional configuration (functional blocks) of the above-described number-theoretic transform processing apparatus 10. Regarding each of the functional blocks, as actual hardware, the control device 301 reads out a program from a storage medium and executes the program to load the above-described functional blocks onto the main storage device 302. In other words, the above-described functional blocks are generated on the main storage device 302.

Additionally, a part or a whole of the above-described functional blocks may be implemented by hardware such as an integrated circuit (IC) without use of software.

Further, in a case of using a plurality of processors to implement each function, each of the processors may implement either one of the functions or two or more of the functions.

Moreover, a computer realizing the number-theoretic transform processing apparatus 10 may operate in any form. For example, the number-theoretic transform processing apparatus 10 may be realized by a single computer. Alternatively, for example, the number-theoretic transform processing apparatus 10 may be caused to operate in the form of a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A number-theoretic transform processing apparatus for a noise in lattice-based cryptography, comprising:
    a memory; and
    a hardware processor coupled to the memory and configured to perform number-theoretic transform of the noise using a precomputation table including a combination of products of 2k+1 or less elements (where k is a positive integer) that belong to a subspace of a finite field Zq and indicate coefficients of the noise, with 2n or less number-theoretic transform constants selected from number-theoretic transform constants of $\{1, \omega, \omega^2, \ldots, \omega^{n-1}\}$ and $\{\gamma, \gamma\omega, \gamma\omega^2, \ldots, \gamma\omega^{n-1}\}$ (where $\omega^n \equiv (\bmod q), \gamma^2 \equiv \omega (\bmod q)$), without performing a computation for the products included in the precomputation table, reducing a number of Zq multiplications in the number-theoretic transform of the noise over a polynomial ring Rq.

2. The apparatus according to claim 1, wherein
the precomputation table includes a combination of products of all elements belonging to the subspace, with the 2n or less number-theoretic transform constants.

3. The apparatus according to claim 1, wherein
the precomputation table includes a combination of products of one or more elements except zero in elements belonging to the subspace, with the 2n or less number-theoretic transform constants.

4. The apparatus according to claim 1, wherein
the precomputation table includes only one of a pair of products having values that are converted to each other by changing between plus and minus signs.

5. The apparatus according to claim 1, wherein
the precomputation table includes a combination of products of one or more elements that occur as coefficients of the noise at higher frequencies than a threshold frequency of occurrence among elements belonging to the subspace, with the 2n or less number-theoretic transform constants.

6. The apparatus according to claim 1, wherein
the processor computes a product of a number-theoretic transform constant with a coefficient of the noise by performing additions or subtractions over the finite field Zq plural times.

7. The apparatus according to claim 6, wherein
the product of the number-theoretic transform constant with the coefficient of the noise includes a first product stored in the precomputation table and a second product not stored in the precomputation table, and
the processor reads out the first product from the precomputation table and computes the second product by performing additions or subtraction over the finite field Zq plural times.

8. A quantum computing device configured to perform at least one of key generation, encryption, decryption and key encapsulation using the apparatus of claim 1.

9. A number-theoretic transform processing method for a noise in lattice-based cryptography, comprising:
    reading out, using a hardware processor, a precomputation table including a combination of products of 2k+1 or less elements (where k is a positive integer) that belong to a subspace of a finite field Zq and indicate coefficients of the noise, with 2n or less number-theoretic transform constants selected from number-theoretic transform constants of $\{1, \omega, \omega^2, \ldots, \omega^{n-1}\}$ and $\{\gamma, \gamma\omega, \gamma\omega^2, \ldots, \gamma\omega^{n-1}\}$ (where $\omega^n \equiv 1 (\bmod q), \gamma^2 \equiv \omega (\bmod q)$), from a storage; and
    performing, using the hardware processor, number-theoretic transform of the noise using the precomputation table, without performing a computation for the products included in the precomputation table, reducing a number of Zq multiplications in the number-theoretic transform of the noise over a polynomial ring Rq.

10. A quantum computing method of at least one of key generation, encryption, decryption and key encapsulation using the processing method of claim 9.

11. A computer program product having a non-transitory computer readable medium including programmed instructions, the instructions causing a computer configured to perform number-theoretic transform processing of a noise in lattice-based cryptography, to function as a processor that performs number-theoretic transform of the noise using a precomputation table including a combination of products of 2k+1 or less elements (where k is a positive integer) that belong to a subspace of a finite field Zq and indicate coefficients of the noise, with 2n or less number-theoretic transform constants selected from number-theoretic transform constants of $\{1, \omega, \omega^2, \ldots, \omega^{n-1}\}$ and $\{\gamma, \gamma\omega, \gamma\omega^2, \ldots, \gamma\omega^{n-1}\}$ (where $\omega^n \equiv 1 (\bmod q), \gamma^2 \equiv \omega (\bmod q)$), without performing a computation for the products included in the precomputation table, reducing a number of Zq multiplications in the number-theoretic transform of the noise over a polynomial ring Rq.

* * * * *